Nov. 25, 1958　　　F. OSTWALD　　　2,861,589
PRESSURE REGULATOR
Filed Sept. 27, 1955
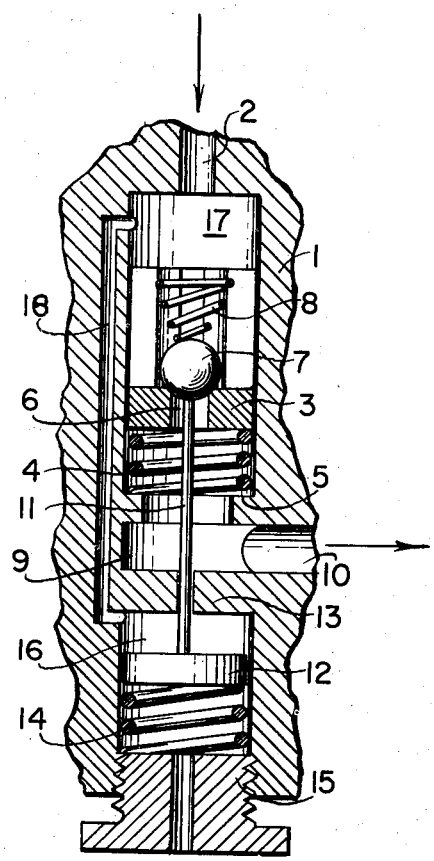

United States Patent Office 2,861,589
Patented Nov. 25, 1958

2,861,589

PRESSURE REGULATOR

Fritz Ostwald, Heppenheim, Germany

Application September 27, 1955, Serial No. 537,010

Claims priority, application Germany September 30, 1954

5 Claims. (Cl. 137—505.13)

This invention relates to pressure regulators, and more particularly to improvements in pressure regulators of gaseous and liquid mediums.

In his copending application, Serial No. 462,981, filed October 18, 1954, now Patent No. 2,844,161, the applicant discloses a pressure regulator for gaseous and liquid mediums to control the pressure in a conduit in any desired relation to the changing pressure in another conduit; hence, apparatus is provided by which a constant or variable pressure ratio can be maintained and by which the pressure in a branch line can be controlled in relation to the pressure of a main line. The pressure regulator disclosed in the copending application, functioning between a high pressure conduit and a low pressure conduit, or else, between a pressure conduit and a branch line, is provided with a slidable control instrument, a valve, slide or similar device actuated by a spring. The closure or locking part of the control instrument is operated by a control member slidable under the influence of the low pressure and regulated by a spring. In further accordance with the copending application, at least one of the two spring assemblies may also provide for an operation wherein the pressure ratio is to change.

The invention as submitted herein refers to a further development and improvement of the invention of the copending application, in that the member operating the closure or locking part is under the influence of primary or high pressure and not under the influence of secondary or low pressure. With respect to the pressure regulator of the copending application, a drop in secondary pressure as a consequence of the decrease in primary pressure is not independent from the amount of pressure passing through the regulator; this means that the dependence of the secondary pressure on the primary pressure, when the primary pressure is decreasing, does not coincide with such dependence as occurs when the primary pressure is increasing. Thus, there is no unequivocal coordination of pressures in the low pressure and high pressure chambers. Furthermore, when the regulator is used as a braking power distributor, the desired dependence between primary and secondary pressure is such that the secondary pressure in relation to the primary pressure changes very little where high primary pressures are concerned. Consequently, the piston regulating the flow reacts comparatively less sensitively to changes of pressure. This disadvantage is also overcome by supplying the control piston with primary pressure.

The accompanying drawing is a diagram of a pressure regulator in accordance with the invention.

Referring now to the drawing, a conduit 2, coming from a high pressure pickup, opens into a casing 1. Casing 1 is provided with a perforated slidable wall or piston 3 which is propped up by means of spring 4 acting against a stop or abutment 5. Sliding control or perforated wall 3 has a perforation 6, the opening of which serves as the seat for a closure 7 which, in the embodiment under consideration, has the shape of a sphere. Closure 7 is under the action of a spring 8. The pressure medium admitted by the pressure regulator goes to a low pressure chamber 9 of the pressure pickup. A conduit 10, which picks up the secondary pressure is connected to chamber 9. Closure 7 is actuated by a pressure stem 11 of piston 12.

The pressure stem 11 slides in a fluid-tight manner through the wall 13 of casing 1. By means of a spring 14, piston 12 is braced against an adjustment screw 15. Chamber 16, which houses piston 12, is connected to chamber 17 or respectively to conduit 2 by conduit 18. This embodiment of the invention differs from the embodiment of the invention disclosed in the copending application in that casing wall 13 is provided herein, through which pressure stem 11 slides in a pressure-tight manner and in the provision of conduit 18.

The operation of the regulator of the instant invention differs from the regulator of the copending application at least in that the piston 12 and thereby the closure 7 are controlled by the supplied primary pressure. The scope of applicability of the regulator is similar to that indicated in the copending application.

More particularly, it will be noted that the passage of fluid from conduit 2 to conduit 10 via passage 6 is controlled by the seating of closure 7 on the aperture of the sliding control 3. Thus, the relative movements of sliding control 3 and closure 7 constitute the control of fluid flow.

Acting downwardly on the sliding control 3 in a manner to decrease the volume of the chamber therebeneath is the pressure at the conduit 2. In opposition to this pressure are the force of the spring 4 and the pressure in chamber 9.

Acting downwardly on the closure 7 are the force of spring 8 and pressure at conduit 2 transmitted via conduit 18 to piston 12. Oppositely thereto is the force of spring 14 as controlled by the adjustment 15.

The operation according to the invention is believed to be quite clear. In the position of rest, the closure 7 is lifted from its seating on the sliding control 3. When the pressure rises in conduit 2, it also rises in conduit 18 until the piston 12 overcomes spring 14. When the closure 7 is seated on sliding control 3 there is no longer any rise of pressure in conduit 10. If a further rise of pressure in conduit 2 causes sliding control 3 to overcome spring 4, the closure 7 is separated from the sliding control 3 so that increased pressure occurs in chamber 9. An even greater increase of pressure in conduit 2 will again cause actuation of piston 12 and closing of the communication between conduits 2 and 10. In this manner, there is always obtained a pressure differential between conduits 2 and 10 which can be predetermined by the characteristics of springs 4 and 14 and by the ratio of the surfaces of sliding control 3 and piston 12. The greater the strength of spring 14 with respect to spring 4, the smaller will be the pressure differential between conduits 2 and 10, and correspondingly the weaker spring 14 is in respect to spring 4 the greater is the pressure differential.

With springs having a linear characteristic, the pressure regulator will have an angular curve. With springs having a progressive characteristic, for example, according to the square law such as would be in the case with pressure stressed rubber parts, the regulator can have any desired curve with any desired ratio between the pressures in conduits 2 and 10.

What I claim is:

1. A fluid pressure regulator comprising a casing having a high pressure chamber with a fluid inlet and a low pressure chamber with a fluid outlet, a perforated wall separating the chambers and slidable in the casing to vary the respective volumes of the chambers in inverse ratio, a first spring urging the perforated wall in a direction to increase the volume of the low pressure chamber and decrease that of the high pressure chamber, a closure for the perforated wall in the high pressure chamber, a control piston including an actuating stem engaged with the closure, a second spring biassing the control piston in a direction to open the closure, an adjustment operatively associated with said second spring to control the force exerted by the same, and a fluid connection from the high pressure chamber to the control piston to actuate the latter in a direction to close the closure.

2. A fluid pressure regulator for operation with high and low pressure conduits, comprising a casing having a high pressure inlet and a low pressure outlet and defining a bore therebetween, a sliding control in said bore between the high pressure inlet and low pressure outlet and defining a passage for the flow of a pressure medium, a first spring urging said control toward the high pressure inlet, a closure for said passage on the high pressure inlet side of the sliding control, a piston operatively associated with said closure, an adjustment screw, a second spring interposed between said piston and adjustment screw for urging said closure out of said passage, and means for transmitting the pressure at said high pressure inlet to said piston to act thereupon in opposition to said second spring for controlling the flow of fluid through said passage.

3. A pressure regulator, as claimed in claim 2, wherein said means comprises a conduit in the casing for transmitting the high pressure from the inlet to said piston.

4. A pressure regulator, as claimed in claim 3, wherein said operative association of said piston with said closure comprises a stem for coupling said piston to said closure, said casing including a wall separating the low pressure outlet from said conduit and further separating said piston from said closure and slidably accommodating said stem.

5. A fluid pressure regulator for operating with high and low pressure conduits comprising a casing defining a first chamber having a high pressure inlet adapted for being coupled to the high pressure conduit and a second chamber having a low pressure outlet adapted for being coupled to the low pressure conduit, a first perforated wall slidable between and separating said first and second chambers, said casing defining a third chamber, a second perforated wall separating said second and third chambers, an adjustment screw positioned in said third chamber, an abutment on said casing in said second chamber, a piston slidable in said third chamber, a first spring between said abutment and said first perforated wall, a second spring interposed between said piston and said adjustment screw, a conduit coupling said first and third chambers for the transmission of the high pressure, a closure in said first chamber for closing the perforation of said first perforated wall, and a stem extending through said second perforated wall in fluid-tight contact and operatively associating said piston with said closure, the high pressure and said second spring operating in opposite directions on said piston whereby said piston is actuated by a sufficiently high pressure received via said conduit to cause said closure to close said first perforated wall.

References Cited in the file of this patent

UNITED STATES PATENTS 2,285,049    Parks _____ June 2, 1942